United States Patent [19]

Melnik

[11] Patent Number: 5,978,364
[45] Date of Patent: Nov. 2, 1999

[54] METHOD FOR ROUTING DATA PACKETS WITHIN A WIRELESS, PACKET-HOPPING NETWORK AND A WIRELESS NETWORK FOR IMPLEMENTING THE SAME

[75] Inventor: George A. Melnik, Montrose, N.Y.

[73] Assignee: Philips Electronics North America Corporation, New York, N.Y.

[21] Appl. No.: 08/608,910

[22] Filed: Feb. 29, 1996

[51] Int. Cl.$^6$ ..................................................... H04J 13/00
[52] U.S. Cl. ........................... 370/320; 370/347; 370/389
[58] Field of Search ..................................... 370/422, 419, 370/455, 352, 355, 315, 389, 238, 254, 255, 347, 349, 320, 321, 335, 342; 395/118, 325

[56] References Cited

U.S. PATENT DOCUMENTS

| | | | |
|---|---|---|---|
| 4,939,728 | 7/1990 | Markkula et al. | 370/419 |
| 5,159,673 | 10/1992 | Sackmann et al. | 395/325 |
| 5,247,380 | 9/1993 | Lee et al. | 359/118 |
| 5,355,371 | 10/1994 | Auerbach et al. | 370/255 |
| 5,479,400 | 12/1995 | Dilworth et al. | 370/349 |
| 5,491,694 | 2/1996 | Oliver et al. | 370/455 |
| 5,555,258 | 9/1996 | Snelling et al. | 370/347 |
| 5,579,308 | 11/1996 | Humpleman | 370/352 |
| 5,596,719 | 1/1997 | Ramakrishnan et al. | 370/238 |
| 5,719,860 | 2/1998 | Maison et al. | 370/347 |
| 5,737,318 | 4/1998 | Melnik | 370/254 |

*Primary Examiner*—Douglas W. Olms
*Assistant Examiner*—Shick Hom
*Attorney, Agent, or Firm*—Bernard Franzblau

[57] ABSTRACT

A random multiple path tabular routing method for routing data packets within a wireless, packet-hopping network, e.g., an intelligent lighting control system, which includes the steps of programming a plurality of the individual nodes to each serve as a repeater node for at least one other individual node, the repeater nodes forming multiple programmed communication paths between the central node and each of at least selected ones of the individual nodes, and randomly hopping the data packets along the programmed communication paths. The repeater nodes are preferably programmed on the basis of nodal connectivity information obtained during a network initialization process. The repeater nodes are preferably programmed by storing compact partial routing tables in a memory portion of each of these repeater nodes. This routing method is partially deterministic or tabular in that routing tables are used to preprogram the multiple communication paths, and partially random, in that the data packets are randomly hopped along these preprogrammed multiple paths, rather than being hopped along preprogrammed singular paths. Each of the individual nodes preferably includes a first address table and a second address table stored in its respective memory. The step of programming is preferably carried out by storing in the first address table of each of the individual nodes at least its own address, and storing in the second address table of each of the individual nodes the address of each node for which that node is selected to serve as a repeater node. The step of randomly hopping the data packets is preferably carried out by programming each of the nodes which receives a data packet to compare the address contained in the address byte of that data packet with the address(es) stored in its first address table, and if a match is detected, to respond to that data packet, and to compare the address contained in the address byte of that data packet with the address(es) stored in its second address table, and if a match is detected, to repeat that data packet. All data communications are preferably carried out in accordance with a CSMA protocol. The invention also relates to a network which is programmed to implement this routing method.

36 Claims, 2 Drawing Sheets

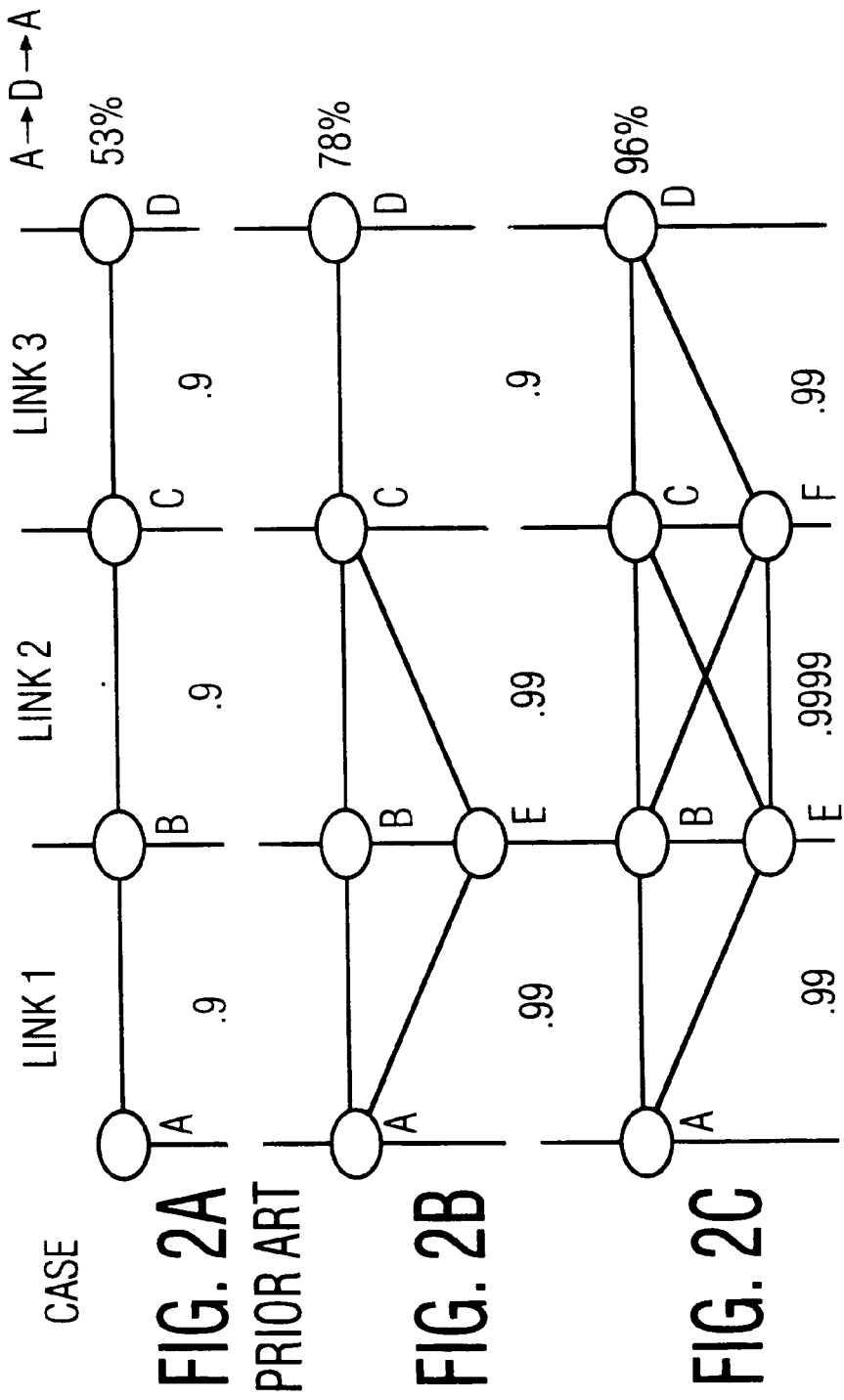

METHOD FOR ROUTING DATA PACKETS WITHIN A WIRELESS, PACKET-HOPPING NETWORK AND A WIRELESS NETWORK FOR IMPLEMENTING THE SAME

BACKGROUND OF THE INVENTION

The present invention relates generally to wireless, packet-hopping networks, and more particularly, to a method of routing data packets within such a network, and to a wireless network for implementing the same.

A network which consists of a plurality of nodes which communicate with each other and with a central node via wireless (RF) links is generally referred to as a wireless (or radio) network. In such wireless networks, each node includes a digital signal processing device (e.g., a microprocessor) and an RF transceiver which has a prescribed transmitting range. Data is typically communicated (transferred) between the individual nodes and the central node by a technique known as "packet hopping", in which individual packets of data are transferred from the central node to a destination node and from an origin node to the central node by being hopped from node-to-node in accordance with a network routing protocol.

"Packets" are logical units of data typically ranging in size from about 5–1000 bytes. Generally, these packet-hopping data communications are under the control of the central node, which is usually a computer on which resides the data communications control software. The packet-hopping data transfer scheme enables a reduction in the cost of the RF transceivers and compliance with FCC Part 15 requirements. Each packet of data contains the address of the node from which it originated or is destined. The address of each node is established when the network is originally installed.

Such wireless, packet-hopping networks are particularly suitable for controlling one or more functions or systems of a building, e.g., the lighting, HVAC, and/or security systems of the building, because it offers a low-cost, indoor topology that does not require new lines to be added to the existing structure in order to carry the network information. Further, such networks could support additional systems installed in the building, such as paging and personal communications systems.

The central node of such building control networks is typically a programmable central controller or building computer on which resides the system control software. The individual nodes are typically distributed throughout the building to monitor the status/value of prescribed parameters of the building system being controlled, and to produce control signals in response to commands issued by the building computer to adjust such parameters as required. It is important that the building computer be able to send and receive data to and from each node in the network in order to properly monitor the status/value of such prescribed parameters, and to issue commands to adjust such parameters as required, in accordance with the system control software.

An exemplary building control network is an automatic or intelligent lighting control system which monitors lighting levels, occupancy status, energy consumption as a function of time, and/or other lighting parameters of each room and/or area of the building within the network, i.e., each room and/or area of the building which is equipped with a lighting module(s) linked to an RF transceiver which constitutes a node in the network under the control/management of the building computer.

In such an intelligent lighting control system, each of the lighting modules is preferably individually programmable (e.g., by building occupants) to provide direct control of the lighting level of the lamps associated therewith. In this regard, each of the lighting modules includes one or more sensors (e.g., occupancy status, daylight (ambient lighting), and dimming/lighting level sensors) which provide sensor feedback data to an onboard digital signal processing device (e.g., a microprocessor) which is programmed to analyze the sensor feedback data and to generate control signals for adjusting the lighting level of the monitored lamp(s) associated therewith, as required, to achieve the programmed local lighting conditions.

This sensor feedback data is also transmitted by each node in the network to the building computer, when requested by the building computer to do so, or when the local lighting conditions change. The building computer analyzes such sensor feedback data in accordance with lighting system control software loaded therein, and sends control data (commands) to the individual nodes, as required, in order to adjust the lighting levels of the monitored rooms/areas of the building in accordance with the lighting system control software, e.g., to optimize the energy efficiency of the lighting system, and thereby override the programmed lighting levels provided by the individual lighting modules. Thus, in addition to being individually programmable and being capable of independent operation, the distributed modules are functionally integrated into a single building-wide network under the control of the building computer.

The installation of a building control network entails the physical placement and powering of each node in the network. The address of each node in the network can either be programmed into the node at installation or, if preprogrammed, logged into the memory of the central node (building computer), along with the physical location of each node in the network. Data communications in such networks are generally between the building computer and the individual nodes, and vice versa, over a common communications channel, in accordance with a network routing protocol. The data is transferred in packets from the building computer to a destination node outside of the immediate transmitting range of the building computer (i.e., not directly linked or "connected" to the building computer) by hopping or relaying each packet from node-to-node until the packet reaches the destination node. Each of the nodes which hops or relays a packet to one or more other nodes in the network is commonly referred to as a "repeater". The destination node generally acknowledges receipt of a data packet from the building computer by returning an acknowledgement data packet to the building computer via one or more repeaters in a similar fashion.

There are generally two main categories of network routing algorithms or protocols that are utilized in wireless networks, namely, random and deterministic (tabular) routing protocols. With a random routing protocol, packets are randomly hopped through the nodes in the network from a sender node to a destination node along random routes, with no specific set of repeaters being used to effectuate the data transfer. More particularly, with the random routing protocol, the sender node transmits a packet to all nodes within its transmitting range and each node which receives the packet then re-transmits or relays the packet to every node within its respective transmitting range, and so on, until the packet reaches the destination node. Typically, each packet contains a byte commonly called the "hop counter", which is decremented by each repeater until it reaches zero. Once it reaches zero, the packet is no longer repeated. The hop counter is set by the sending (transmitting) node such that the probability that the packet reaches the destination node is maximized, without dominating the network for an unduly lengthy period of time.

In order to minimize simultaneous transmissions of packets over the common network channel, a channel access protocol is utilized. The most common channel access protocol is the carrier sense multiple access (CSMA) protocol, according to which each node, prior to transmitting a packet, waits for a random delay period, and then senses the channel to determine whether it is available ("clear") or unavailable ("busy"). If the channel is sensed to be clear it transmits the packet, and if the channel is sensed to be busy, it waits for another random delay period before sensing the status of the channel again before making a further attempt to transmit the packet.

However, since all nodes in the network are not within the "listening range" of each other, it frequently occurs that two nodes which are outside of each other's listening range will sense that the channel is clear and transmit respective packets which overlap in time to the same receiving node, thereby resulting in corruption of both data packets, which appear as noise to the receiving node. This phenomenon is generally referred to as an "unavoidable or unresolvable collision". With the random routing protocol, there is a rather high probability that most, if not all, nodes in the network will handle each and every packet transmitted, thereby greatly increasing the data traffic density in the network, and thus, greatly limiting the number of different packets which can be "on the network" at any given time (i.e., the data traffic handling capacity of the network). This limits the communication efficiency of the network, as well as increasing the number of unresolvable collisions which occur.

These unresolvable collisions of data packets can cause packets to be lost before they reach their destination. In this connection, in building control networks, the acknowledgement packets returned to the building computer typically converge on just a few nodes that are linked to the building computer, thereby resulting in a higher probability and greater number of unresolvable collisions involving such packets. Consequently, blockage of acknowledgement packets is common, thereby forcing the building computer to re-transmit a packet in order to determine whether the original packet sent was actually received by the destination node.

According to the deterministic or tabular routing protocol, the building computer formulates routing tables on the basis of nodal connectivity information which it gathers during execution of a network initialization routine. These routing tables are then used to route packets of data from a sender node to a destination node via a specific set or "chain" of repeaters (i.e., along a predetermined route or singular path defined in the routing tables). This allows for many different packets to be "on the network" simultaneously, thereby resulting in relatively higher network data traffic handling capacity than is possible with the random routing protocol. However, because of intrinsic RF constraints of wireless networks, the deterministic routing protocol severely limits the communication efficiency of the network, thereby resulting in a relatively low probability of a given packet being able to reach its destination, due to its being routed along a single, predetermined path, as opposed to multiple random paths (as with the random routing protocol).

In this regard, the reliability of node-to-node communications in indoor, wireless networks is adversely affected by phenomena such as fading and multipath (the interference of an RF signal with itself due to reflections off surfaces such as walls, floors, ceilings, furniture, etc.), whereby previously established node-to-node links can be interrupted or lost. Further, such previously established node-to-node links can be interrupted or lost by virtue of dynamic changes in the indoor environment of the building, such as certain activities of the building occupants. For example, the simple action of opening or closing or door, moving furniture, or even walking down a hallway can disrupt a node-to-node communication link. Thus, the status of any given node-to-node link within the network may vary over time from solid, to sporadic, to non-existent, depending upon a number of largely unpredictable and uncontrollable variables.

Because of these inherent link reliability problems, data packets transmitted along a singular path can be easily lost before they reach their destination, thus requiring such data packets to be re-transmitted, thereby degrading the communications efficiency of the network. All that is required for a transmission to be unsuccessful is for a single link in the chain of repeaters to be broken either on the outbound transmission of a command data packet from the building computer to the destination node, or on the inbound transmission of the acknowledgement data packet from the destination node to the building computer. If the link quality of the problemmatic link(s) is not resolved satisfactorily, then the packet may have to be re-routed, and/or the network reconfigured, thereby further degrading the performance of the network, and increasing its cost and complexity.

A deterministic routing algorithm which incorporates reconfigurability is certainly an improvement over standard deterministic routing algorithms. Such a deterministic routing algorithm is disclosed in co-pending U.S. patent application Ser. No. 08/558,447, filed Nov. 16, 1995, in the name of A. Dasgupta and assigned to the assignee of the present invention, the disclosure of which is herein incorporated by reference. However, such a routing algorithm still requires the attention of the operator or some preprogrammed handling routine (typically executed by the building computer) which can identify the faulty link or leg of the route, and program a route around it. Such re-routing can be extremely time-consuming and entirely unwarranted if the blockage being experienced is temporary. Furthermore, the new path may be no better than the previous path. This algorithm may also require that a significant portion of the routing information be contained in the data packets, thereby increasing the size of such packets, and, consequently, further reducing the data traffic handling capacity and communication efficiency of the network.

There are various known ways to address the above-described link reliability problems. One way to improve link reliability is to use higher-powered RF transceivers, and another way to improve link reliability is to use noise-limiting spread spectrum transceivers. However, both of these approaches are generally cost-prohibitive for many applications. Of course, a hard-wired network would be an ideal solution, but the cost of installing such a network in an existing structure is cost-prohibitive for most applications.

Based on the above and foregoing, it can be appreciated that there presently exists a need in the art for a method for routing packets in a wireless, packet-hopping network which overcomes the above-described drawbacks, shortcomings, and disadvantages of the presently available technology. The present invention fulfills this need in the art.

SUMMARY OF THE INVENTION

The present invention encompasses a random multiple path tabular routing method for routing data packets within a wireless, packet-hopping network, e.g., an intelligent lighting control system, which includes the steps of programming a plurality of the individual nodes to each serve as a repeater node for at least one other individual node, the repeater nodes forming multiple programmed communication paths between a central node (also referred to as a "network control node") and each of at least selected ones of the individual nodes, and randomly hopping the data packets along the programmed communication paths. The repeater nodes are preferably programmed on the basis of nodal connectivity information obtained during a network initialization process.

The repeater nodes are preferably programmed by storing compact partial routing tables in a memory portion of each of these repeater nodes. This routing method is partially deterministic or tabular in that routing tables are used to preprogram the multiple communication paths, and partially random, in that the data packets are randomly hopped along these preprogrammed multiple paths, rather than being hopped along preprogrammed singular paths.

Each of the individual nodes preferably includes a first address table and a second address table stored in its respective memory, e.g., a EEPROM or other non-volatile memory device. The step of programming is preferably carried out by storing in the first address table of each of the individual nodes at least its own address, selecting a plurality of the individual nodes to serve as a repeater node for at least one other node, and storing in the second address table of each of the individual nodes the address of each node for which that node is selected to serve as a repeater node.

The step of randomly hopping the data packets is preferably carried out by programming each of the nodes which receives a data packet to compare the address contained in the address byte of that data packet with the address(es) stored in its first address table, and if a match is detected, to respond to that data packet, and to compare the address contained in the address byte of that data packet with the address(es) stored in its second address table, and if a match is detected, to repeat that data packet. All data communications are preferably carried out over a common RF channel in accordance with a prescribed channel access protocol, e.g., the CSMA protocol.

Each of the individual nodes is preferably programmed to store the packet ID of each packet that it repeats in a packet ID memory, e.g., a 2-byte cyclical (FIFO) packet ID buffer, and to compare the packet ID of each packet that it receives with the packet ID(s) stored in its packet ID memory, and if a match is detected, to discard that data packet. In this way, "backlash" (i.e., the hopping of data packets in a direction opposite that of their destination) is prevented.

In a preferred embodiment of the present invention, at least one (and most preferably, each) of the repeater nodes is programmed to serve as a repeater node for at least one other node, but for less than all of the other nodes in the network. Further, the total number of repeater nodes can be less than the total number of individual nodes in the network.

In one embodiment of the present invention, the multiplicity of individual nodes are organized into two or more separate sets or groups of functionally or logically interrelated nodes, each group having a unique group address. In this embodiment, the programming step further includes the sub-steps of storing in the first address table of each node the group address of any group to which that node belongs, selecting a subset of the nodes in the network to serve as a group repeaters for each respective group, and storing in the second address table of each group repeater node the group address of any group for which it has been selected to serve as a group repeater.

In a further embodiment of the present invention, the entire network is provided with a global address, and the programming step further includes the sub-steps of storing the global address in the first address table of each of the individual nodes, and programming a selected subset of the individual nodes to serve as a global repeater for the entire network by storing the global address in the second address table of each of the global repeaters.

The present invention also encompasses a wireless network which is programmed to implement the routing method of the present invention.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE INVENTION

Figure 1:
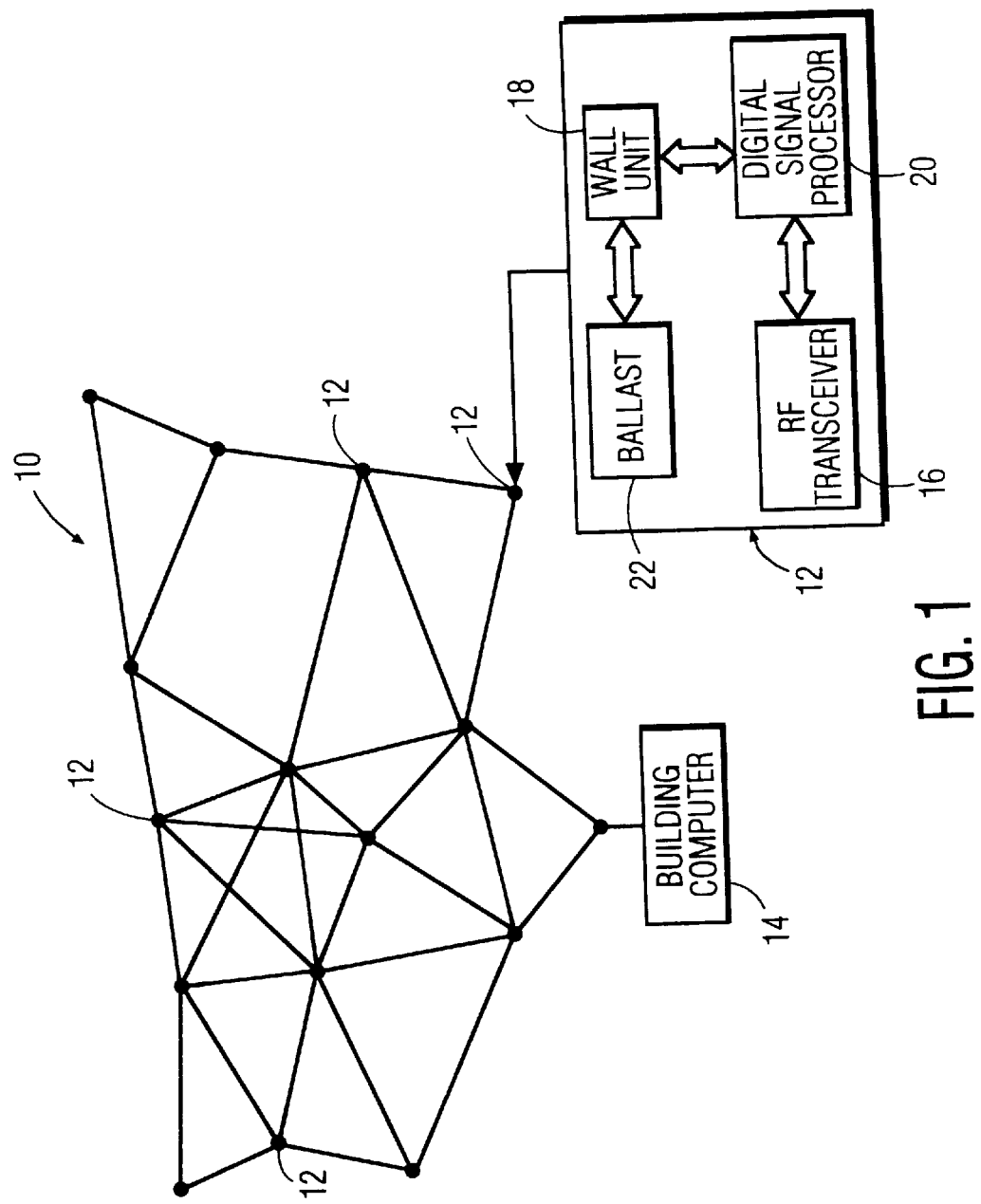
FIG. 1 is a block diagram of a wireless, packet-hopping intelligent lighting control system with which the packet-routing method of the present invention may be utilized; and, FIGS. 2A, 2B, and 2C are diagrams illustrating the probabilities of a packet being successfully transmitted from an origin node to a destination node and back to the origin node for three different routing examples, respectively, one of which constitutes an example of a prior art routing scheme, and the other two of which constitute examples of the routing scheme of the present invention.

In overview, in accordance with the routing method of the present invention, data packets are randomly hopped along multiple paths which are preselected and preprogrammed based upon nodal connectivity information obtained during a network initialization routine, thereby maximizing the probability of successful transmissions. In this regard, the routing method of the present invention is partially deterministic or tabular, in that routing tables are used to preprogram the multiple paths between nodes using a specific subset of nodes which are programmed to serve as repeaters, rather than randomly hopping packets along all possible paths using all of the nodes in the network as repeaters, as is done with the purely random routing method of the prior art, and partially random, in that the packets are randomly hopped along these preprogammed multiple paths, rather than being hopped along preprogrammed singular paths, as is done with the purely deterministic routing method of the prior art. Accordingly, as will be more fully developed hereinafter, the benefits and advantages of both the prior art purely random routing method (i.e., high probability of success of communications) and the prior art purely deterministic routing method (i.e., high data traffic handling capacity of the network) are realized with this random multiple path tabular routing method of the present invention, while at the same time eliminating the disadvantages and shortcomings of these prior art routing methods.

The random multiple path tabular routing method of the present invention is basically implemented by programming and storing a compact partial routing table in a memory portion of at least preselected ones of the nodes in the network, rather than transmitting packets which contain the full routing information, as is done with the purely deterministic routing method of the prior art. It should be noted that the routing method of the present invention eliminates the need for including the full routing information in the data packets, thereby greatly decreasing the size of the packets, and thus, greatly increasing the data traffic handling capacity and communications efficiency of the network, as well as enabling a significant reduction in the hardware requirements of the network (e.g., the required baud rate and size of the packet buffers).

In this connection, the partial routing table stored in the memory portion of each of the preselected nodes includes a "repeat" address table which contains the address(es) of the node(s) for which that node is programmed to repeat. If the address contained in an address byte of a packet matches any of the addresses stored in the repeat address table of a particular node, then that node repeats the packet. Thus, each of the preselected nodes serves as a repeater node (or simply, "repeater").

Further, each of the nodes in the network (including any non-repeater nodes) has a unique address which is stored in the memory portion of the node. If the address contained in the address byte of a packet matches the address of a particular node, then that node executes a command contained in a command byte of the packet. In the preferred embodiment of the present invention, each of the nodes in the network (including any non-repeater nodes) includes an "answer_to" address table which contains, in addition to its own address, the address(es) of any group(s) that node belongs to, and/or an address, referred to as a "global" address, that constitutes the common address of each node in the network (thus, all of the nodes in the network can be considered to be a "global group").

Accordingly, when it is desired to communicate a packet to a group of nodes (or to every node) in the network, it is only necessary to include the address of the entire group (or the global address) in the address byte of a packet, whereby each node in the addressed group (or in the entire network) processes the packet and executes the command contained in the command byte of that packet, rather than individually addressing each node in the entire group (or in the entire network).

This is particularly useful when it is desired to organize or configure the network into a plurality of distinct groups of nodes which are functionally or logically interrelated. For example, in the context of an intelligent lighting control system for a building, it may be desired to organize alternating odd and even ones of the lights in a hallway into separate groups, so that a first group of the lights can be commanded "off" and the second group of lights can be commanded "on" after normal business hours, e.g., for energy conservation and security purposes. Other examples of logically interrelated groups of nodes include all utility rooms in a building (or wing(s) thereof), all (or selected) rooms in a particular wing(s) of a building, and all restrooms in a building (or wing(s) thereof). Global addressing may be used for such purposes as dimming all lights in the building in the case of "brown-outs" mandated by local authorities or utility companies, and for forcing all lights in the building to full brightness in the event of an emergency. Such group and global addressing enables the execution of commands issued by the building computer in a fraction of the time that would be required to address each node in the group or network individually.

Also, nodes in the network are preferably organized into communication "clusters" or "cells" in which all of the nodes in each cell are at least within "listening range" of each other (i.e., able to sense whether any of the other nodes are transmitting a data packet at any given time), to thereby minimize the incidence of unresolvable collisions of data packets within the cell. When programming multiple paths between the central node and a given individual node, the nodes selected as repeaters for each leg of the multiple paths are preferably located in a common cell, so that they can "hear" each other, to thereby minimize the incidence of unresolvable collisions of data packets communicated between the central node and the given individual node.

Moreover, the repeat address table stored in each of the repeater nodes may additionally include the address(es) of any group (including the "global group") for which that node is selected to serve as a repeater. In this regard, it is preferable that only a specific subset (preferably at least two but less than all) of the nodes in the network be programmed to serve as repeaters for that group, to thereby minimize the number of unresolvable collisions of data packets which might otherwise occur.

The partial routing tables stored in the repeater nodes can be thought of as being comprised of both the "repeat" and "answer_to" address tables. In fact, in the preferred embodiment of the present invention, all of the nodes in the network (including any non-repeater nodes), are provided with partial routing tables consisting of the "repeat" and "answer_to" address tables. Of course, any nodes which are not selected to serve as repeaters for any other node in the network will not have any active entries in their "repeat" address table. Preferably, the partial routing tables are stored in a non-volatile memory device, such as an onboard EEPROM (electrically erasable programmable read only memory), so that they can be actively maintained without the risk of losing critical routing information during spurious power outages.

The random multiple path tabular routing method of the present invention (and network implementing the same) will now be described in greater detail with respect to the illustrative wireless, packet-hopping network 10 depicted in FIG. 1 for the sake of simplicity and ease of illustration of the present invention. The network 10 consists of a plurality of individual nodes 12 and a building computer 14 ("central node"). Each of the nodes 12 includes an RF transceiver 16, a wall unit 18, and digital signal processing circuitry 20 (e.g., a microprocessor) which includes a memory (e.g., a EEPROM and/or RAM) and one or more counters. The wall unit 18 may be of any convenient type well-known to those skilled in the art, e.g., a ballast control module for controlling the lighting level of a linked ballast or luminaire 22, e.g., a dimmable fluorescent lamp. The wall unit 18 preferably includes one or more sensors (not shown), e.g., one or more occupancy status, daylight, and/or dimming/lighting level sensors) which provide feedback information for the digital signal processing circuitry 20, which processes this sensor feedback information for transmission by the RF transceiver 16 to the building computer 14 as packets of data.

The building computer 14, based upon sensor feedback information received from the nodes 12, and in accordance with lighting control software which resides therein, generates control data which is transmitted as packets of data to the nodes 12. This control data is then processed by the digital signal processing circuitry 20 of the nodes 12 and supplied to the wall units 18, which in response thereto, produce control signals to adjust the lighting level of their associated ballasts 22, as required.

In a presently contemplated network, the individual wall units 18 are individually programmable (e.g., by building occupants) to control the lighting level of their associated lamps 22. In this network, the building computer 14, via the network 10, overrides the programmed settings of the wall units 18, in accordance with the lighting system control software loaded into the building computer 14. Of course, those skilled in the pertinent art will readily appreciate that the configuration, topology, and/or type of network in which the routing method of the present invention is utilized is not limiting to the present invention.

With continuing reference to FIG. 1, essentially all data traffic in the network 10 is directed between the building computer 14 and the nodes 12, and vice versa. The data packets transmitted by the building computer 14 to the nodes 12 are commonly referred to as "command" data packets, and the data packets transmitted by the nodes 12 to the building computer 14 are commonly referred to as "acknowledgement" data packets. As such, it is only necessary to include the address of the node to which a command data packet is transmitted in both the command and acknowledgement data packets, as opposed to including the address of both the sending node and the receiving node in each data packet, since the address of the sending node is given (i.e., it is always the building computer 14). In other words, the nodes 12 are programmed to return all acknowledgement data packets to the building computer 14, regardless of the origin of such acknowledgement data packets. In this way, the length of the transmitted data packets can be made smaller, thereby increasing the data traffic handling capacity and communications efficiency of the network 10. Group and global addressing is accomodated with additional addresses. As previously mentioned, and as will be more fully developed hereinafter, maintaining address tables at each node further reduces the length of the data packets for maximum network efficiency.

In an exemplary embodiment of the present invention, each command data packet includes an address (ADDR) byte, a packet ID byte, a command instruction (CMD) byte, a command data (CMD_DATA) byte, and a checksum (CHKSUM) byte. The packet ID byte contains a packet identification code which enables the nodes 12 and the building computer 14 to determine the identity of the data packet. The checksum byte indicates the total number of binary "1" (or "0") data bits in the data packet, to thereby enable the receiving node to "check" the validity of the data packet. In this regard, invalid data packets are discarded. Of course, the specific data structure of the packets is not limiting to the present invention, and is described herein for illustrative purposes only. In general, bytewise communications permit the use of existing serial communications standards, such as the RS-232 standard, which are compatible with existing communications systems, thereby further simplifying the network communications protocol and hardware requirements.

It will be readily appreciated that many of the nodes 12 in the network 10 are outside of the effective transmitting range of the building computer 14 and vice versa. In this regard, a node 12 is generally considered to be outside of the effective transmitting range of the building computer 14 (and vice versa) if that node is unable to receive valid or uncorrupted data therefrom. Thus, nodes between the building computer 14 and a destination node to which it is desired to transmit a data packet must be programmed to relay or hop the data packet along a communication path(s) between the building computer 14 and the destination node. As previously mentioned, a node which is programmed to relay or repeat a data packet is commonly referred to as a repeater node (or simply, "repeater").

With the prior art random packet routing protocol, all nodes are programmed to serve as repeaters for all other nodes, thereby providing a multiplicity of random communication paths between the building computer 14 and a given destination node. With the prior art deterministic packet routing protocol, only one specific set of nodes forming a singular communicatin path between the building computer 14 and a given destination node are programmed to serve as repeaters for relaying a data packet to that destination node, thereby providing only a singular, predetermined communication path between the building computer 14 and that destination node.

In accordance with the present invention, a specific set of nodes between the building computer 14 and a given destination node which form multiple paths between the building computer 14 and that destination node and which are capable of serving as effective repeaters for that destination node are programmed to serve as repeaters for that destination node, thereby providing multiple (two or more), predetermined communication paths between the building computer 14 and that destination node. Preferably, for each node 12 which is outside of the effective transmitting range of the building computer 14 (or, more broadly, which is not directly linked to the building computer 14), a specific set of nodes which form multiple paths between the building computer 14 and that node are programmed to serve as repeaters for that node, to thereby provide multiple, predetermined communication paths between the building computer 14 and each node which is outside of its effective transmitting range (or which is not directly linked to the building computer 14).

In operation, data packets are communicated between the building computer 14 and each node 12 which is not directly linked to the building computer 14 by being randomly transmitted along the preprogrammed multiple paths between the building computer 14 and that node. In this connection, a channel access protocol is utilized for all data communications within the network 10 in order to minimize the probability of unavoidable collisions of data packets being transmitted. Preferably, a carrier sense multiple access (CSMA) protocol is utilized, in which each repeater waits for a random delay period, and then senses the channel to determine whether it is available ("clear") or unavailable ("busy"), prior to attempting a transmission of a data packet. If the repeater senses that the channel is clear, then it transmits the data packet. If the repeater senses that the channel is busy, then it waits for another random delay period before sensing the channel again in a further attempt to transmit the data packet. Any node awaiting an open channel for transmission is incapable of receiving a packet. The random delay periods are typically between 0–3 times the packet transmission time including transmitter and receiver initialization times. Allowing for longer delays slows the propagation of a packet, but minimizes the probability of unavoidable collisions of data packets due to the delay between transmitter power-up and the time neighboring nodes actually "hear" the transmission. Of course, the particular channel access protocol which is utilized is not limiting to the present invention.

The building computer 14 selects and programs the nodes which are to serve as repeaters for each node 12 which is outside of the effective transmitting range of the building computer on the basis of nodal connectivity information which it obtains during a network intialization process. The specific network initialization routine which is utilized is not limiting to the present invention. Preferably, the automatic network initialization process disclosed in co-pending U.S.

patent application Ser. No. 08/579,650, filed Dec. 27, 1995, in the name of the present inventor, and assigned to the assignee of the present invention, the disclosure of which is incorporated by reference, is utilized. By using this automatic network initialization process, the building computer 14 can gather the complete nodal connectivity information for the network 10, including statistical information regarding the quality of the link between each pair of nodes that are regarded as being connected, confirmation of two-way nodal links, and the entire connectivity of each node 12 in the network 10 to every other node 12 in the network 10.

In accordance with the present invention, the building computer 14 determines which specific set of nodes intermediate the building computer 14 and each node 12 not directly linked to the building computer 14 to select as repeaters for that node based upon the nodal connectivity information obtained during the network initialization process. More particularly, the nodes which are selected to serve as repeaters for a given node are preferably those which form the multiple communication paths between the building computer 14 and that node which are the most efficient routes for transmission of data packets and which maximize the probability of success of data transmissions between the building computer 14 and that node. In this connection, additional initialization runs and/or incremental initializations can be performed to develop additional paths and to most accurately determine which paths are the most effective. Further, as previously discussed, when programming multiple paths between the central node and a given individual node, the nodes selected as repeaters for each leg of the multiple paths are preferably located in a common cell, so that they can "hear" each other, to thereby minimize the incidence of unresolvable collisions of data packets communicated between the central node and the given individual node.

It will be appreciated that although the probability of successful communications is increased by providing a greater number of programmed paths, at some point the incremental increase in the probability of successful communications is outweighed by the decrease in the data traffic handling capacity of the network 10, i.e., a point of "diminishing marginal returns" is reached. In some cases (depending upon the particular topology and/or configuration of the network), a point is reached at which the number of programmed paths becomes so great as to result in a net decrease in the probability of successful communications, and/or becomes so great as to decrease the data traffic handling capacity of the network 10 below a desired threshold level. In the extreme case, in which all nodes are programmed to serve as repeaters for all other nodes in the network, the network routing protocol becomes the totally random (i.e., totally non-deterministic) routing protocol of the prior art. Thus, there is a trade-off between the probability of successful communications and the data traffic handling capacity of the network 10 (i.e., the number of different packets that can be simultaneously placed on the network 10).

Thus, in order to realize the partially deterministic, partially random routing method of the present invention, and its attendant benefits and advantages, each of the nodes which are programmed to serve as repeaters are programmed to serve as a repeater for at least one but less than all of the other nodes in the network. With the random multiple path tabular routing method of the present invention, it is possible that all nodes will be programmed to serve as a repeater for at least one other node in the network 10, but it is not possible that all nodes will be programmed to serve as a repeater for all other nodes in the network 10. In general, only those nodes which are capable of acting as the most effective repeaters for a given node are programmed to serve as a repeater for that node. Further, the total number M of nodes programmed to serve as repeaters for one or more other nodes may be less than the total number N of nodes in the network (i.e., M<N).

As previously described, a particular node is programmed to serve as a repeater by merely storing the address of the node(s) for which that node is to serve as a repeater, in the "repeat" address table thereof. By programming all of the nodes which are to serve as repeaters in this way, predetermined multiple paths between the building computer and each node which is not directly linked to the building computer are thereby programmed. Of course, the particular paths chosen preferably provide the most efficient routes for hopping the data packets back and forth between the building computer and each of the nodes which are not directly reachable by the building computer, as previously discussed.

In operation, a command data packet to be sent to a destination node not directly linked to the building computer 14 is transmitted by the building computer 14. All nodes which are within the transmitting range of the building computer 14 then receive the packet and compare the address contained in the ADDR byte of the packet (which is the address of the destination node) with the address(es), if any, stored in their "repeat" address tables. Of course, each node which has been programmed to serve as a repeater for the addressed destination node will find a match. Each such repeater then transmits the packet to all nodes which are within its transmitting range, after waiting for a random delay period, and when the common RF channel of the network 10 is clear, in accordance with the CSMA protocol. Otherwise stated, each such repeater "repeats" the packet. If the destination node receives the packet, then the transmission of the command packet from the building computer 14 to the addressed destination node is successfully completed. In this regard, each of the nodes which receives the packet compares the address contained in the ADDR byte of the packet with the address(es) stored in its "answer to" table. Of course, only the destination node will detect a match.

However, if there are one or more additional "legs" (or "links") of the programmed multiple paths between the building computer 14 and the destination node, (i.e., if the addressed destination node is outside of the transmitting range of the repeater(s) for the first leg of the route), then the repeater(s) for each additional leg of the programmed multiple paths between the building computer 14 and the destination node "repeat" the packet in the same manner described above, until the destination node receives the packet, whereby the transmission of the command packet from the building computer 14 to the addressed destination node is successfully completed.

It should be noted that in some cases the destination node may be within the transmitting range of the repeater(s) for the first leg of the programmed multiple paths, even if there are one or more additional legs, in which case, it is possible that the destination node will receive the packet before the repeater(s) for the additional leg(s) repeat the packet, thereby effectively bypassing or skipping the intermediate repeater(s) for the additional leg(s), thereby decreasing the time required for successful completion of the transmission. This phenomenon, which is sometimes referred to as "hop-scotching", is accomodated by the CSMA protocol, which ensures sufficient randomness in the routing of the packets along the programmed multiple paths to minimize the incidence of unresolvable collisions of data packets in either direction.

After the destination node receives a packet, it executes the command contained in the CMD byte of the packet, and, if commanded to do so (or unless commanded or programmed not to do so), and then formulates an acknowledgement packet for transmission back to the building computer 14 along the same programmed multiple paths. The routing of the acknowledgement packet back to the building computer 14 is the same as described above for routing a command packet from the building computer 14 to the destination node, except in the reverse order. It should be noted that the address contained in the ADDR byte of the returned acknowledgement packet is advantageously the same as that contained in the ADDR byte of the command packet (i.e., the address of the destination node), for the reasons previously explained, but the packet ID of the acknowledgement packet is different than that of the command packet. It will be appreciated that the actual path which the command and acknowledgement packets follow will be a random one of the programmed multiple paths.

In order to prevent the hopping of a packet in the opposite direction along a programmed path (i.e., in the case of a command data packet, back towards the building computer), which is sometimes referred to as "backlash", each node which has already repeated a packet logs that packet's ID in memory, so that if this packet is again received by that node, it will not be re-transmitted ("re-repeated") by that node. In this connection, in a presently preferred embodiment of the present invention, each node is provided with a two-byte, cyclical (FIFO) packet ID buffer for enabling continuous storage of the packet IDs of the two previously transmitted packets, so that neither of the two previously transmitted packets are "re-repeated". Of course, the size and type of buffer utilized are not limiting to the present invention.

A command data packet to be sent to a destination group of nodes not directly linked to the building computer 14 is routed to the destination group of nodes in a similar manner. More particularly, all nodes which are within the transmitting range of the building computer 14 receive the packet and compare the group address contained in the ADDR byte of the packet (which is the address of the destination group of nodes) with the address(es), if any, stored in their "repeat" address tables. Of course, each node which has been programmed to serve as a repeater for the addressed group of nodes will detect a match. Each such "group" repeater then transmits the packet to all nodes which are within its transmitting range, after waiting for a random delay period, and when the common RF channel of the network 10 is clear, in accordance with the CSMA protocol. Otherwise stated, each such "group" repeater "repeats" the packet. If each of the nodes within the addressed group of nodes receives the packet, then the transmission of the command packet from the building computer 14 to the addressed destination group is successfully completed. In this regard, each of the nodes which receives the packet compares the address contained in the ADDR byte of the packet with the address(es) stored in its "answer_to" table. Of course, only the nodes in the addressed destination group will detect a match.

However, if there are one or more additional "legs" of the programmed multiple paths between the building computer 14 and the destination group of nodes, (i.e., if the addressed destination node is outside of the transmitting range of the repeater(s) for the first leg of the route), then the "group" repeater(s) for each additional leg of the programmed multiple paths between the building computer 14 and the destination group of nodes "repeat" the packet in the same manner described above, until each of the nodes in the destination group receives the packet, whereby the transmission of the command packet from the building computer 14 to the addressed destination group of nodes is successfully completed.

Each of the nodes in the destination group of nodes then formulates an acknowledgement packet, if commanded to do so (or unless commanded or programmed not to do so), for transmission back to the building computer 14 along the same programmed multiple paths. The routing of the acknowledgement packets back to the building computer 14 is the same as described above for routing a command packet from the building computer 14 to the destination group of nodes, except in the reverse order. It should be noted that group repeater nodes which also belong to the addressed group for which they serve as a group repeater may be required to both repeat and respond to a packet. In this regard, if a group repeater is commanded or programmed to return an acknowledgement packet in response to a packet addressed to a group to which it belongs, it is preferable that the group repeater repeat the packet first, and then (after suitable delays) formulate and return the acknowledgement packet, although this procedure is not limiting to the present invention.

A command data packet to be sent to all of the nodes 12 in the network 10 is routed as follows. More particularly, all nodes which are within the transmitting range of the building computer 14 receive the packet and compare the global address contained in the ADDR byte of the packet with the address(es), if any, stored in their "repeat" address tables. Of course, each node which has been programmed to serve as a "global" repeater for the entire network 10 will find a match. Each such "global" repeater then transmits the packet to all nodes which are within its transmitting range, after waiting for a random delay period, and when the common RF channel of the network 10 is clear, in accordance with the CSMA protocol. Otherwise stated, each such "global" repeater "repeats" the packet. Each "global" repeater which receives the packet transmitted by the first set of "global" repeaters also repeats the packet. Once all of the nodes 12 in the network 10 receive the packet, then the transmission is successfully completed. In this regard, each of the nodes which receives the packet compares the address contained in the ADDR byte of the packet with the address(es) stored in its "answer_to" table. Of course, in this case, all of the nodes 12 in the network 10 will detect a match.

After receipt of a globally addressed command packet, each of the nodes 12 in the network 10, if commanded to do so (or unless commanded or programmed not to do so), then formulates an acknowledgement packet for transmission back to the building computer 14 along the same programmed multiple paths. The routing of the acknowledgement packets back to the building computer 14 is the same as described above for routing a command packet from the building computer 14 to all of the nodes 12 in the network 10, except in the reverse order.

It should be noted that global repeater nodes may be required to both repeat and respond to a packet. In this regard, if a global repeater is commanded or programmed to return an acknowledgement packet in response to a globally addressed packet, it is preferable that the global repeater repeat the packet first, and then (after suitable delays) formulate and return the acknowledgement packet, although this procedure is not limiting to the present invention. Further, in order to minimize the incidence of unavoidable collisions of data packets and to prevent domination of the network 10 by the acknowledgement packets (and the attendant diminution of network data traffic handling capacity), it is preferable that only selected ones of the nodes 12 in an addressed group (including the global group) be programmed (or commanded) to return acknowledgement packets in response to command packets containing a group (or global) address.

In order to illustrate the increased probability of successful communications of data packets in a wireless, packet-hopping network using the random multiple path tabular routing method of the present invention versus the purely deterministic, singular path routing method of the prior art, reference is now made to FIG. 2.

More particularly, FIGS. 2A, B, and C depict the three different cases in which a packet is transmitted from a node A to a node D and back to node A (i.e., A→D→A), along a singular path A→B→C→D, using the prior art purely deterministic routing method, wherein the nodes B and C intermediate the nodes A and D serve as repeaters. The first link of the communication path(s) between the nodes A and D is designated as "Link 1", the second link of the communication path(s) between the nodes A and D is designated as "Link 2", and the third link of the communication path(s) between the nodes A and D is designated as "Link 3".

For the sake of simplicity and ease of discussion, the probability of success of a communication between any two linked nodes is assumed to be 0.90 (90%). Of course, as was discussed hereinabove, the actual probability of success of a communication between any two linked nodes will vary as a function of time due to various uncontrollable variables (e.g., due to the dynamics of the indoor environment, fading, multipath, etc.). However, assigning a fixed probability of success for each link simplifies the present analysis without materially affecting the validity thereof.

FIG. 2A depicts the case in which a packet is transmitted from a node A to a node D and back to node A (i.e., A→D→A), along a singular path A→B→C→D, using the prior art purely deterministic routing method, wherein the nodes B and C intermediate the nodes A and D serve as repeaters. In order for the communication A→D→A to be successful, the packet must hop nodes A→B→C→D→C→B→A, resulting in a probability of $(0.9)^6=0.53$ (53%) that the communication A→D→A will be successful.

FIG. 2B depicts the case in which a packet is transmitted from a node A to a node D and back to node A (i.e., A→D→A), along either the communication path A→B→C→D or A→E→C→D, in accordance with the random multiple path tabular routing method of the present invention, wherein both nodes B, C, and E serve as repeaters for node D, thereby increasing the probability of success for Link 1 and Link 2 from 0.90 to 0.99, thereby resulting in a probability of $(1-(1-0.9)^2)^{4}* 0.9^2=0.78$ (78%) that the communication A→D→A will be successful. Thus, a 47% increase in the probability of success of the communication A→D→A is realized over the example given in FIG. 2A because only the node-node connection A→B or the node-node connection A→E need be successful for Link 1 to be completed, thereby increasing the success rate of this link to 99%, and further, because only the node-node connection B→C or the node-node connection E→C need be successful for Link 2 to be completed, thereby also increasing the success rate of this link to 99%.

FIG. 2C depicts the case in which a packet is transmitted from a node A to a node D and back to node A (i.e., A→D→A), along any of the communication paths A→B→C→D, A→E→D, A→B→F→D, A→E→C→D, A→E→F→D, in accordance with the random multiple path tabular routing method of the present invention, wherein nodes B, C, E, and F serve as repeaters for node D, thereby increasing the probability of success for Link 1 from 0.90 to 0.99, increasing the probability of success of Link 2 to 0.9999, and increasing the probability of sucess of Link 3 to 0.99, thereby resulting in a probability of 0.96 (96%) that the communication A→D→A will be successful. Thus, an 81% increase in the probability of success of the communication A→D→A is realized over the example given in FIG. 2A because only the node-node connection A→B or the node-node connection A→E need be successful for Link 1 to be completed, thereby increasing the success rate of this link to 99%, and further, because only one of the node-node connections B→C, E→C, E→F, or B→F need be successful for Link 2 to be completed, thereby increasing the success rate of this link to 99.99%, and further, because only either the node-node connection C→D or the node-node connection F→D need be successful for Link 3 to be completed. For sake of simplicity and clarity, none of these examples take the possibility of "hop-scotching" into account, which would result in further improvements in the probability of success of the communication A→D→A.

Based on the above and foregoing, it can now be appreciated that the random multiple path tabular routing method of the present invention provides many benefits and advantages over the presently available deterministic and random routing methods, including, but not limited to, those that are enumerated below.

Namely, with the random multiple path tabular routing method of the present invention:

(1) no active routing reconfiguration or reconfiguration algorithms are required for nodes in the network which do not respond due to temporary blockages, as long as a sufficient number and quality of multiple paths have been programmed;

(2) multiple transmissions will always ensure that all possible preprogrammed paths are attempted without requiring reconfiguration, (3) reconfiguration is as simple as programming another node(s) to serve as a repeater(s), and does not require elimination of previously programmed paths, thereby precluding the need to reconfigure back to the earlier path if the new path fails;

(4) reconfiguration may be accomplished by executing additional and/or incremental automatic initialization routines and/or by manually programming one or more additional nodes to serve as repeaters based on connectivity information obtained from the first (or previous) initialization routine;

(5) the partial routing tables (or simply, "routing tables") are compact, since each node need only store the address(es) of the node(s) for which it is required to repeat;

(6) since the routing tables are stored at each node, the packets are not required to contain this routing information, thereby enabling the transmission of shorter packets, thus improving network efficiency and relaxing the hardware requirements of the network (e.g., the size of the packet buffers and the baud rate, etc.);

(7) multiple packet buffers are not required, since each of the nodes need only handle one packet at a time (i.e., only a single packet buffer is required); and, (8) the benefits and advantages of both the prior art purely random routing method (i.e., high probability of success of communications) and the prior art purely deterministic routing method (i.e., high data traffic handling capacity of the network) are realized with this random multiple path tabular routing method of the present invention, while at the same time eliminating the disadvantages and shortcomings of these prior art routing methods.

Although various preferred embodiments of the present invention have been described in detail hereinabove, it should be clearly understood that many variations and/or modifications of the basic inventive concepts herein taught which appear to those skilled in the pertinent art will still fall within the spirit and scope of the present invention as defined in the appended claims.

What is claimed is:

1. A method for routing data packets within a wireless network including a central node and individual nodes, comprising the steps of:

programming a plurality of said individual nodes to each serve as a repeater node for at least one other one of said individual nodes, said individual nodes programmed to serve as a one of said repeater nodes forming at least two programmed communication paths between said central node and each of at least selected ones of said individual nodes; and randomly hopping data packets along said programmed communication paths.

2. The method as set forth in claim 1, wherein the step of programming is carried out on the basis of nodal connectivity information obtained during a network initialization process.

3. The method as set forth in claim 1, wherein:

each of said individual nodes includes an address table; and the step of programming is carried out by storing a routing table in said address table of each of said individual nodes programmed to serve as a repeater node.

4. The method as set forth in claim 1, wherein:

each of said individual nodes includes a first address table which contains at least its own address, and a second address table; and, the step of programming includes a sub-step of storing in said second address table of each of said individual nodes programmed to serve as a repeater node the address of each node for which that node is programmed to serve as a repeater node.

5. The method as set forth in claim 4, wherein the step of randomly hopping data packets along said programmed communication paths includes the sub-steps of:

said central node transmitting said data packets to all nodes within its transmitting range;

each of said nodes which receives a data packet transmitted by said central node comparing an address contained in an address byte of that data packet with at least one address stored in each of its first and second address tables, and if a match is detected between said at least one address stored in said first address table and said address contained in said address byte, responding to that data packet, and if a match is detected between said at least one address stored in said second address table and said address contained in said address byte, repeating that data packet; and, each of said nodes which receive a data packet repeated by other ones of said nodes comparing said address contained in said address byte of that data packet with said at least one address stored in its first and second address tables, and if a match is detected between said at least one address stored in said first address table and said address contained in said address byte, responding to that data packet, and if a match is detected between said at least one address stored in said second address table and said address contained in said address byte, repeating that data packet.

6. The method as set forth in claim 5, wherein said network has a common RF channel, and all data communications within said network are via said common RF channel.

7. The method as set forth in claim 6, wherein all data communications within said network are carried out in accordance with a prescribed channel access protocol.

8. The method as set forth in claim 7, wherein said prescribed channel access protocol is a carrier sense multiple access protocol.

9. The method as set forth in claim 5, wherein each of said nodes includes a packet ID memory and each said data packet includes a packet ID byte which contains a packet identification code identifying that data packet, and the step of randomly hopping data packets along said programmed communication paths includes the further sub-steps of:

each of said nodes which repeats a data packet storing said packet identification code of that data packet in its packet ID memory; and, each of said nodes which receives a data packet determining whether said packet identification code of that data packet is already stored in its packet ID memory, and, if so, discarding that data packet.

10. The method as set forth in claim 1, wherein said selected ones of said individual nodes are not directly linked to said central node.

11. The method as set forth in claim 1, wherein each of said individual nodes programmed to serve as a repeater node is programmed to serve as a repeater node for at least one other node, but for less than all other nodes in the network.

12. The method as set forth in claim 1, wherein said network comprises a building system control network, and said central node comprises a building computer.

13. The method as set forth in claim 5, wherein said individual nodes are organized into at least two separate groups of nodes each having a unique group address, and the step of programming includes the further sub-steps of:

storing in said first address table of each of said individual nodes the group address of any group to which it belongs; and, programming a selected subset of said individual nodes to each serve as group repeater nodes for each of said groups by storing in said second address table of each of said groups of repeater nodes the group address of any group for which it has been selected to serve as a group repeater node.

14. The method as set forth in claim 5, wherein said entire network has a global address, and the step of programming includes the further sub-steps of:

storing said global address in said first address table of each of said individual nodes; and, programming a selected subset of said individual nodes to serve as global repeaters for the entire network by storing said global address in said second address table of each of said global repeaters.

15. A method for routing data packets within a wireless network comprised of a central node and individual nodes, comprising the steps of:

programming multiple paths between said central node and each of at least selected ones of said individual nodes;

randomly hopping data packets between said central node and said selected ones of said individual nodes via the programmed multiple paths;

wherein each of said individual nodes has a unique address and is provided with first and second address tables, and the step of programming includes the sub-steps of:

storing in said first address table of each of said individual nodes at least its own address;

selecting a plurality of said individual nodes to each serve as a repeater node for at at least one other one of said individual nodes; and, storing in said second address table of each of said individual nodes programmed to serve as a repeater node the address of said at least one other one of said individual nodes.

16. The method as set forth in claim 15, wherein the step of programming is carried out on the basis of nodal connectivity information obtained during a network initialization process.

17. The method as set forth in claim 15, wherein the step of randomly hopping includes the sub-steps of:

each of said nodes which receives a data packet comparing an address contained in an address byte of that data packet with at least one address stored in said first address table, and if a match is detected between said at least one address stored in said second address table and said address contained in said address byte, responding to that data packet; and, each of said nodes which receives a data packet comparing said address contained in said address byte of that data packet with at least one address stored in its second address table, and if a match is detected between said at least one address stored in said second address table and said address contained in said address byte, repeating that data packet.

18. A method for programming a wireless network comprised of a central node and individual nodes each having an address, comprising the steps of:

providing each of said individual nodes with a first address table and a second address table;

storing in said first address table of each of said individual nodes at least its own address;

storing in said second address table of each of selected ones of said individual nodes the address of at least one other one of said individual nodes; and, wherein said selected ones of said individual nodes form multiple predetermined paths between said central node and each of at least selected ones of said individual nodes.

19. The method as set forth in claim 18, further comprising the steps of:

programming each of said individual nodes to respond to any data packet which contains an address which matches any address stored in its said first address table; and, programming each of said individual nodes to repeat any data packet which contains an address which matches any address stored in its said second address table.

20. A wireless network, comprising:

a central node which includes an RF transceiver, digital signal processing circuitry, and a memory; and, individual nodes each of which includes an RF transceiver, digital signal processing circuitry, and a memory, a plurality of said individual nodes being programmed to each serve as a repeater node for at least one other one of said individual nodes, said individual nodes programmed to serve as a repeater node forming at least two programmed communication paths between said central node and each of at least selected ones of said individual nodes.

21. The wireless network as set forth in claim 20, wherein said central node is programmed to execute a network initialization routine for obtaining nodal connectivity information for programming said programmed communication paths.

22. The wireless network as set forth in claim 20, wherein each of said repeater nodes further includes a routing table stored in its memory.

23. The wireless network as set forth in claim 20, wherein each of said individual nodes further includes a first address table which contains at least its own address, and a second address table which contains an address of each node for which that node is programmed to serve as a repeater node.

24. The wireless network as set forth in claim 23, wherein the network is programmed to randomly hop data packets along said programmed communication paths.

25. The wireless network as set forth in claim 20, wherein the network is programmed to randomly hop data packets along said programmed communication paths.

26. The wireless network as set forth in claim 24, wherein:

each of said individual nodes is programmed to compare an address contained in an address byte of a data packet that it receives with at least one address stored in its said first address table, and if a match is detected, to respond to that data packet; and, each of said individual nodes is programmed to compare an address contained in an address byte of a data packet that it receives with at least one address stored in its said second address table, and if a match is detected, to repeat that data packet.

27. The wireless network as set forth in claim 26, wherein:

the network has a common RF channel;

all data communications within the network are via said common RF channel; and, all data communications within the network are carried out in accordance with a prescribed channel access protocol.

28. The wireless network as set forth in claim 27, wherein said prescribed channel access protocol is a carrier sense multiple access protocol.

29. The wireless network as set forth in claim 25, wherein:

each of said individual nodes includes a packet ID memory, and each data packet includes a packet ID byte which contains a packet identification code identifying that data packet;

each of said individual nodes programmed to serve as a repeater node is programmed to store said packet identification code of each packet that it repeats in its said packet ID memory; and, each of said individual nodes programmed to serve as a repeater node is programmed to compare said packet identification code of each data packet that it receives with said packet identification codes stored in its said packet ID memory, and, if a match is found, to discard that data packet.

30. The wireless network as set forth in claim 20, wherein each of said individual nodes programmed to serve as a repeater node for each leg of at least selected ones of said programmed communication paths are located within a common cell comprised of a plurality of said nodes which are within an effective listening range of each other.

31. The wireless network as set forth in claim 20, wherein the total number of individual nodes each of which was programmed to serve as a repeater node is less than the total number of individual nodes in the network.

32. The wireless network as set forth in claim 20, wherein the network is a building system control network, and said central node comprises a building computer.

33. The wireless network as set forth in claim 26, wherein:

said individual nodes are organized into at least two separate groups of nodes each having a unique group address;

said first address table of each of said individual nodes further contains said group address of any group that node belongs to;

a selected subset of said individual nodes are programmed to serve as group repeater nodes for each said group; and, said second address table of each of said individual nodes further contains said group address of any group for which that node is programmed to serve as a group repeater.

34. The wireless network as set forth in claim 26, wherein:

the entire network has a global address;

said global address is stored in said first address table of each of said individual nodes; and, a selected subset of said individual nodes are programmed to serve as global repeaters for the entire network; and, storing said global address in said second address table of each of said global repeaters.

35. The wireless network as set forth in claim 20, wherein the network is an intelligent lighting system control network.

36. The wireless network as set forth in claim 20, wherein at least one of said individual nodes programmed to serve as a repeater node is programmed to serve as a repeater node for at least one other node in the network, but for less than all other nodes in the network.

* * * * *